United States Patent [19]

Peterson et al.

[11] Patent Number: 4,567,025

[45] Date of Patent: Jan. 28, 1986

[54] CHEMICAL SEPARATION METHOD FOR URANIUM ISOTOPES

[75] Inventors: Steven H. Peterson, Murrysville; D. Colin Phillips, Monroeville, both of Pa.

[73] Assignee: Westinghouse Electric Corp., Pittsburgh, Pa.

[21] Appl. No.: 525,590

[22] Filed: Jul. 28, 1983

[51] Int. Cl.[4] .............................................. B01D 59/00
[52] U.S. Cl. ................................ 204/157.2; 423/253; 204/157.21
[58] Field of Search ................ 204/158 R; 423/3, 253

[56] References Cited

U.S. PATENT DOCUMENTS

| | | | |
|---|---|---|---|
| 4,199,679 | 4/1980 | Ami-Rav | 250/251 |
| 4,351,707 | 9/1982 | Turro | 204/158 R |
| 4,362,669 | 12/1982 | Kramer et al. | 204/158 R |
| 4,389,292 | 6/1983 | Phillips et al. | 204/158 R |

OTHER PUBLICATIONS

Podoplelov et al., "Use of a Magnetic Isotope Effect for Separating Heavy Isotopes as Exemplified by Tin" *Chem. Abstracts*, vol. 91, (1979), 10770u.

Ebert et al., "The Intercalation of Graphite by Uranium Hexafluoride" *Chem. Abstracts*, vol. 88, (1978) 112155c.
Maugh, "Minute Magnetic Moment of Many Isotopes . . ." *Science* vol. 206, (Oct. 19, 1979), p. 317.
Turro et al., "Magnetic Isotope and Magnetic Field Effects . . ." *J.A.C.S.* vol. 100, No. 23 (Nov. 1978), pp. 7432-7434.
Turro et al., "Magnetic and Micellar Effects . . ." *JACS* vol. 101 No. 24, (Nov. 1979), pp. 7435-7437.
Turro et al., "Magnetic Isotope Effect . . ." *JACS* vol. 102, No. 3, (Jan. 1980), pp. 1190-1192.

*Primary Examiner*—Teddy S. Gron
*Assistant Examiner*—Virginia B. Caress
*Attorney, Agent, or Firm*—R. A. Stoltz

[57] ABSTRACT

A chemical process for isotopic enrichment of uranium involving the steps of exciting a chelated uranium compound (e.g. hydrated uranyl acetate complex in aqueous solution) to an excited electronic state wherein the excited state preferentially reacts at different rates by virtue of dissimilar nuclear magnetic moment contributions to the chemical kinetics of alternative excited state reaction pathways (e.g. return to ground state by intersystem crossing by electron-nucleus hyperfine coupling vs free radical formation and subsequent precipitation of the hydrated basic salt of uranyl acetate).

5 Claims, 3 Drawing Figures

CHEMICAL SEPARATION METHOD FOR URANIUM ISOTOPES

BACKGROUND OF THE INVENTION

1. Field of the Invention

This invention relates to a chemical method for separation of uranium isotopes. More specifically, the invention relates to the relative enrichment/depletion of uranium isotopes based on differences (i.e., the presence or absence) of a nuclear magnetic moment and their effects on certain chemical reactions.

2. Description of the Prior Art

It is a well known and well documented fact that in order to convert crude uranium ore having an isotopic distribution of typically $^{238}U$ (99.27%), $^{235}U$ (0.72%), and $^{234}U$ (0.06%) to a useful nuclear fuel, the enrichment of $^{235}U$ to a few percent is required. Historically a variety of physical and chemical methods have been suggested and employed for the enrichment of $^{235}U$. In general, these methods have been dependent on differences in the isotopic mass to achieve the separation; i.e., they involve shifts in physical or chemical properties which are mass dependent. For example, in the widely used and traditional gaseous diffusion processes, separations result from the variation of average thermal velocity with mass. However, the mass ratio of $^{238}U/^{235}U$ is 1.013 and separation based on small differences in mass between isotopes requires a large installation to perform the diffusion or centrifugation techniques. These gas transport techniques also require volatile species, a very restrictive requirement. The separations of specific isotopes from mixtures are generally expensive processes, especially in terms of energy requirements. On the other hand, the new techniques that depend on very small differences in optical absorption frequencies require large, expensive laser facilities and still require volatility.

In a series of related recent technical publications, N. J. Turro and co-workers have demonstrated laboratory scale isotope separation of carbon and oxygen; see for example, N. J. Turro and B. Kraeutler, JACS, 100: 23, 7432 (1978); N. J. Turro, B. Kraeutler, and D. R. Anderson, JACS, 101: 24, 7435 (1979); N. J. Turro and M-F Chow, JACS, 102: 3, 1190 (1980); and B. Kraeutler and N. J. Turro, Chem. Phys. Letters, 70, 270 (1980). They decomposed small organic molecules, with isotope enrichment occurring in the excited state with branching reaction paths leading to chemically separable products. A significant enhancement in the isotope selectively was observed when the transient excited states were confined to micelles. Thus, the article by B. Kraeutler and N. J. Turro in Chem. Phys. Letters, Vol. 70, No. 2 entitled "Photolysis of Dibenzyl Ketone in Micellar Solution: Correlation of Isotopic Enrichment Factors with Photochemical Efficiencies Parameters", discloses the enrichment of carbon-13 over carbon-12 by the photolysis of dibenzyl ketone using the fact that carbon-13 has a magnetic moment. Similarly, the use of magnetic nuclear moment to separate oxygen-17 from oxygen-16 and -18 is disclosed in the article by N. J. Turro and M-F Chow, entitled "Magnetic Isotope Effect on the Thermolysis of 9,10-Diphenylanthracene Endoperoxide as Means of Separation of 17 Oxygen from 16 Oxygen and 18 Oxygen" in the JACS, Vol. 102; 3, Jan. 30, 1980, pages 1190 to 1192. In a recent Science article, Vol. 206, Oct. 19, 1979, T. H. Maugh reviewing several of the previous free radical 9,10-diphenylanthracene endoperoxide reactions by N. J. Turro speculates that "the same principle can be applied to any other magnetic isotope, including, presumably, uranium-235, if an appropriate chemical reaction can be found." However, to the best of our knowledge, no such reaction schemes for uranium isotope enrichment have been published.

SUMMARY OF THE INVENTION

In view of the previously known physical methods for isotopic separation, we have discovered a chemical process for isotopic enrichment of uranium comprising the steps of:

(a) preparing a solution of a uranium compound and solvent characterized in that the uranium compound involves a mixture of uranium isotopes wherein the isotopic mixture is to be enriched and the uranium compound is further characterized in that it possesses at least one excited state in solution wherein the respective isotopes in the excited state preferentially react at different rates by virtue of dissimilar nuclear magnetic moment contributions to the chemical kinetics of the excited state reactions and the chemical reactions of the excited state lead to the isolation of a phase that possesses a uranium isotopic distribution characteristic of enrichment;

(b) exciting the uranium compound in solution thus promoting the chemical reaction that preferentially forms the isolated phase containing the enriched uranium isotopic distribution; and (c) separating the enriched phase thus recovering the enriched uranium.

According to the present invention enriched uranium recovered in step (c) above is repeatedly subjected to the sequence of steps (a), (b) and (c), thus achieving an even higher degree of uranium enrichment. Preferably, the solvent is an aqueous solution of the uranyl ion in the presence of at least one complexing ligand (for example, selected from the group consisting of: $CO_3^{2-}$, $O_2^{2-}$, $OH^-$, $F^-$, $CH_3COO^-$, $C_2O_4^{2-}$ and $H_2O$). The excitation process preferably involves photolysis of the complex uranyl ion while in solution. When the ligand is the acetate anion and the excitation is the promotion of the hydrated uranyl acetate complex to an excited electronic state, the preferential chemical reaction in the excited state is the precipitation of the hydrated basic salt of uranyl acetate.

It is a primary object of the present invention to provide an inexpensive chemical process for the isotopic enrichment of uranium. It is an associated object to provide a chemical isotopic separation process that is not mass dependent but rather is nuclear magnetic moment dependent. Thus, it is an interrelated object of the present invention to provide a chemical pathway through an excited state for which the relaxation process (i.e., the chemical kinetics of the reverse reaction) is magnetic moment dependent and a competitive or alternate reaction pathway for that excited state exists that leads to a separable reaction product of enriched $^{235}U$ content. Fulfillment of these objects and the presence and fulfillment of other objects will be apparent upon reading the specification and claims taken in conjunction with the attached drawings.

DESCRIPTION OF THE PREFERRED EMBODIMENTS

The process according to the present invention involves separating uranium into two chemically isolated compounds or phases; one being relatively enriched in the odd atomic weight isotope $^{235}U$ and relatively depleted in the even atomic weight isotope $^{238}U$, while the other is being enriched in the even and depleted in the odd. The isotopic separation or enrichment process is based on the presence or absence of a nuclear magnetic moment, and on the rate of certain chemical reactions that are influenced by such a localized magnetic field. Thus, in order to perhaps better explain and understand the process of the present invention, an overview of the relevant chemical kinetics as well as an overview of the influence of nuclear magnetic moments on the specific rate constants should be presented, in additon to a description of the specific chemical process.

As previously stated, the process according to the present invention involves the excitation of the uranium atom to an excited state that has available to it a reaction pathway that is influenced by the presence or absence of a nuclear magnetic moment. More specifically the excitation process is an electronic energy level transition from the ground (bound) state to ultimately an excited free (unbound) state as illustrated schematically in FIG. 1. This electronic excitation can be performed by the absorption of a sufficiently energetic photon illustrated in FIG. 1 or by a series of promotional steps involving multiple absorption, various thermal excitation methods, or high energy promotion followed by rapid secondary emission.

Figure 1:
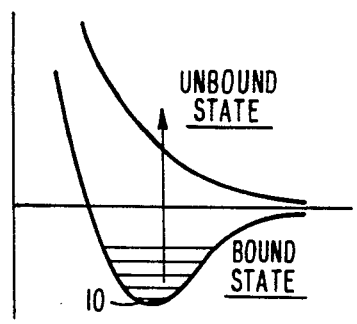
FIG. 1 illustrates an electronic excitation from the bound ground state to an unbound excited state by absorption of a photon.

As conceptually illustrated in FIG. 1, the ground state exhibits an energy surface minimum 10 relative to a reaction coordinate (the horizontal abscissa). This reaction coordinate corresponds to the internuclear distance along the direction of a chemical bond being broken as the first step in the mechanism of the chemical reaction which is to take place. In this ground electronic state, quantized vibrational energy levels (states) exist and the nuclei (the fragments of the compound that separate when the chemical bond breaks) experience an energy barrier when they deviate from the local region of the minimum 10. In other words, in the ground electronic state the nuclei experience attraction, hence the compound exists and is stable. In contrast, the excited electronic state has no minimum and as such the vibrational states are not quantized. The atoms involved in the chemical bond corresponding to the reaction coordinate, repel each other at all distances, rather than having a region of attraction. Thus in the absence of any other consideration the ground state should remain bound while the excited state should lead to bond rupture (i.e., chemical reaction). Usually electronic transisions are very short-lived and the most probable event upon excitation would be the return to a lower energy bound state by secondary emission or alternate energy dissipation. However, the electronic transition from the unbound excited state to the bound ground state according to the present invention is preferably a quantum mechanically forbidden or statistically unfavorable electronic transition thus allowing the atoms sufficient time to separate, rupturing or breaking the chemical bond.

As the bond scission takes place (i.e. displacement from left to right on the abscissa of FIG. 1) the previous chemical bond can be evisioned as undergoing a transition to first a diradical of the same overall original spin state then to a geminate (spin-correlated) radical pair (free to undergo spin precession between the singlet and triplet states) and ultimately to a pair of independent free radicals of totally uncorrelated spin. The probability that the diradical and radical pairs produced in the above manner will re-encounter before they escape as free radicals is high, particularly if the process occurs in the liquid state or in solution.

To the extent that the electronic transition from the excited state to the ground state is strictly forbidden and the spins of the radicals are not realigned to correspond to the overall spin state of the ground electronic state, any re-encounter will be nonproductive in that it merely represents a reformation of the unbound excited state. However, to the extent that the spins are realigned and to the extent that the transition between singlet and triplet states or the reverse can be enhanced, the re-encounter will favor recombination and formation of the parent ground state. Thus intersystem crossing (singlet to the triplet and triplet to singlet) of the diradical pairs during the lifetime of the excited state will favor the return to the original compound at the expense of the ultimate free radical reactions occurring after total disassociation. In this regard, the presence of a nonzero nuclear magnetic moment (e.g. an odd numbered atomic isotope) involved in the bond scission will inherently promote intersystem crossing. This can be viewed as the interaction of the localized magnetic field of the odd numbered nucleus promoting the precession of the electron independent of the other radical thus statistically favoring electron spin realignment (i.e. disruption of spin orientation). This phenomenon has been described as electron-nucleus hyperfine coupling providing a hole for singlet-triplet crossing (or touching). More specifically, the presence of the odd numbered nucleus and the associated nuclear spin mixes the quantum mechanic electronic states and thus removes the previous strictly forbidden nature of the electronic transition.

In accordance with the above view, once a compound has been promoted to the excited state, it can potentially react by two alternate pathways. The chemical bond can rupture or break, thus allowing two free radical fragments to separate and further react according to subsequent collisions of the individual free radicals. Alternatively, the diradicals can recombine, thus returning to the original state. More importantly, the rate of reaction of the recombination step is significantly influenced by the presence or absence of a nuclear magnetic moment (i.e. influenced by an electron-nucleus hyperfine coupling perturbation ). It is also recognized that by caging the diradical/geminate radical pair (i.e. by physically restricting the free radical departure) the probability of re-encounter is enhanced and the influence of intersystem crossing on the chemical kinetics of the reaction pathway is accentuated. This has been demonstrated in the literature by confining the liquid state reaction to small micelles of a soap dispersion. It is envisioned that such a process creates a barrier to the right of the electron energy surfaces of FIG. 1 that in essence forces the free radicals to rebound back through the optimum geometry for diradical recombination, thus statistically enhancing the probability of intersystem crossing and return to the ground state. This feature is provided in the present invention by use of polydentate chelating agents as will be explained later.

Figure 2:
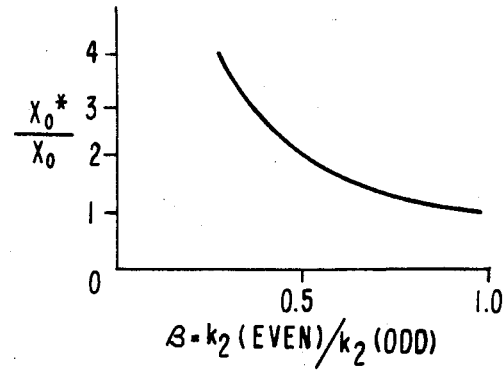
FIG. 2 illustrates the isotope ratio of the excited state to the ground state as a function of the ratio of reaction rate constants following the initiation of some steady state excitation process and in the absence of any process competing with recombination.

If either of the atomic nulcei involved in the bond scission has an odd number of nucleons, the local environment will have a strong magnetic field gradient, so that the recombination of a radical pair will be inhibited. If an element contains a mixture of odd and even weight isotopes, this lifetime effect is sufficient to produce an isotope partitioning. FIG. 2 illustrates how the isotope ratio will differ in the excited state from the ground state, following the initiation of some steady state excitation process, and in the absence of any process competing with recombination. For example, the steady state excitation of species A to excited state A* is given by the following stepwise reactions wherein $k_1$ and $k_2$ are specific rate constants for excitation and relaxation respectively:

A $\xrightarrow{k_1}$ A* (Excitation)

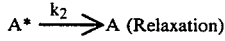

A* $\xrightarrow{k_2}$ A (Relaxation)

For molecules containing both odd and even isotopes, the following relationships exist:

$A_o^* \xrightarrow{\beta k_2} A_o$ (odd)

$A_e^* \xrightarrow{k_2} A_e$ (even)

where: $\beta = \dfrac{k_2 \text{ (even)}}{k_2 \text{ (odd)}}$

At steady state conditions (equilibrium) the first order reversible rate equation would be expresed in a differential form as follows:

$dA/dt = k_1 A - k_2 A^* = 0$ which leads to integral forms:
$A_o^* = A_o[k_1/\beta k_2]$ (odd)

$A_e^* = A_e[k_1/k_2]$ (even)

Thus the fraction of molecules with an odd numbered isotope can be represented by:

$X_o = A_o/[A_o + A_e]$ (ground state)

$X_o^* = A_o/[A_o + \beta A_e]$ (excited state)

which leads to table of representative values.

TABLE

| $\beta$ | $X_o^*$ | $X_o^*/X_o$ | |
|---|---|---|---|
| 1.0 | 0.0072 | 1 | (no isotope effect) |
| 0.9 | 0.0080 | 1.11 | |
| 0.75 | 0.0095 | 1.32 | |
| 0.5 | 0.0143 | 1.97 | |
| 0.25 | 0.0282 | 3.92 | |

FIG. 2 is a plot of the data presented in the Table. It can be seen that the ratio of the fraction of the isotope present in the excited state is influenced by the relative value of the specific rate constants for the relaxation process (i.e. dependent on $\beta = k_2(\text{even})/k_2(\text{odd})$). Thus, such a process leads to isotope-selective partitioning, but the enriched material cannot be separated because it will relax to the ground state at a rate determined by the excited state lifetime. In aqueous solution, such lifetimes are typically milliseconds or shorter.

In order to recover isotopically enriched material, the excited state must have a competing pathway available, leading to a chemically distinct and separable product. Such a pathway might be decomposition, isomerization , precipitation, reaction with another chemical and the like. For example, consider the following:

A $\xrightarrow{k_1}$ A* (Excitation)

A* $\xrightarrow{k_2}$ A (Relaxation)

A* $\xrightarrow{k_3}$ B + C (Decomposition)

Figure 3:
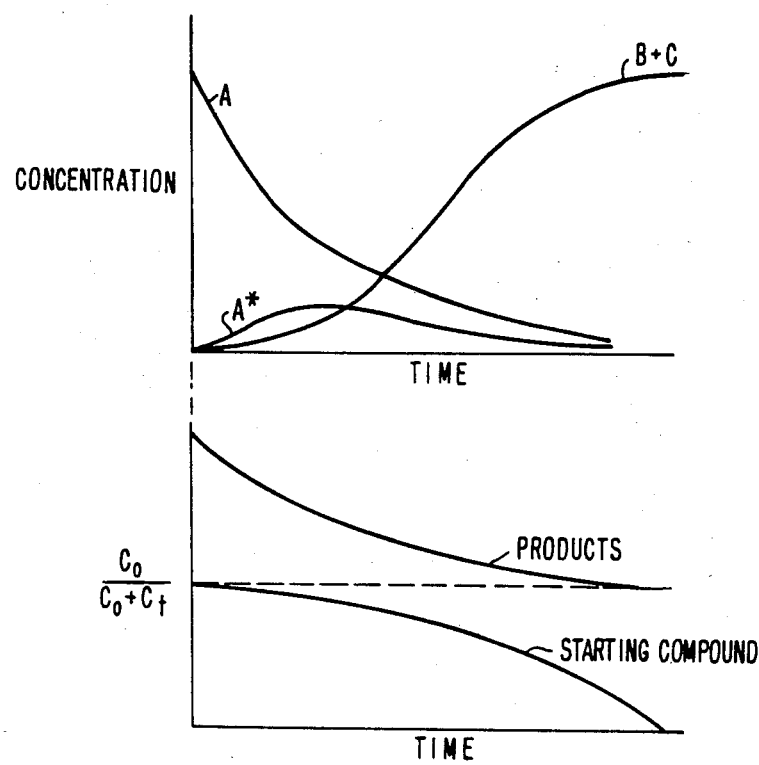
FIG. 3 illustrates, in the upper plot, the concentration of the starting material, the intermediate excited state and the decomposition fragments as a function of time when an alternate excited state reaction pathway exists that is influenced by nuclear spin; the lower plot illustrates the corresponding relative concentration of isotopes as a function of time.

Let B = decomposition fragment containing the isotope of interest. A starting material A can be excited, at rate $k_1$, to an excited state A*, which can either relax back to A with rate constant $k_2$, or can decompose into fragments B + C, with rate constant $k_3$. A* will become enriched in one type of isotope if $k_2$ is influenced by the nuclear spin, as discussed above. The isotope composition of the reaction fragments B'C will be the same as the composition of A* at any givent time. FIG. 3 illustrate the behavior of such a reaction scheme. The overall reaction converts A→B+C, while the transient species A* has only a small concentration at any time, due to its short lifetime. The lower part of FIG. 3 shows how the isotope enrichment in the starting material and products varies as the reaction proceeds. If the whole batch of A is decomposed, no net isotope enrichment will have occurred. At intermediate times, net enrichment is recoverable, with some tradeoff degree of enrichment and amount of enriched material to be recovered.

Variations of the above chemical model or scheme can be readily developed depending on the particular chemical mechanism being considered, including by way of example, but not limited thereto, other methods of excitation, substitution of other excited state reactions for the decomposition being exemplified, interchange of the roles of the specific isotopes, multiple step chemical mechanisms and variations in the methods and basis for separating products from starting material.

In applying the basic concepts discussed above to the chemical separation of uranium isotopes according to the present invention, the following description will be limited to the two isotopes of uranium which have significant natural abundance; i.e. $^{235}U$ (0.72%) and $^{238}U$ (99.27%). The description is also directed to the pragmatic enrichment of $^{235}U$ to a few percent as required for fuel in nuclear reactors. However, it should be kept in mind that the process is equally applicable to other isotope mixtures and other relative concentrations.

In its aqueous chemistry, uranium usually exists in the +6 state as the uranyl ion, $UO_2^{2+}$, or as the +4 ion $U^{4+}$. In either case, the uranium species in solution is best described as a complex, with water or other ligands occupying coordination sites around the central metal ion. Uranium has a rich chemistry of complex formation, which has been extensively reviewed by I. I. Chernyaeu under the title "Complex Compounds of Uranium", translated by L. Mandel, Israel Program for Scientific Translations, Jerusalem, 1966. The following discussion will concentrate on the uranyl species, but in general $U^{4+}$ has similar behavior.

The uranyl species in solution generally has up to six coordination sites in a plane perpendicular to the O-U-O axis. Complexing ligands can occupy these sites, and can displace one another depending on the strength of the metal-ligand interaction. Some ligands, such as acetate, can occupy two or more coordination sites; such ligands are called chelating agents, and form quite stable complexes. The interaction strength of ligands with the uranyl ion can be determined by the complex displacement reactions, with the following partial listing being representative, but not exhaustive, of decreasing complexing strength of useful ligands: $CO_3^{2-} > O_2^{2-} - > OH^- >^{F-} CH_3COO^- > C_2O_4^{2-} > H_2O$. In this listing, all species to the left of a given ligand will displace that ligand. However, the rate of the displacement depends mainly on the strength of the bond that must be broken, and on the thermal energy of the complex. The rate of the reaction will thus depend on the complex involved and the state of excitation of the complex.

The use of ligands and in particular chelating ligands having bidentate or even higher polydenate character is considered a significant feature of the present invention in that any bidentate or higher character will contribute the desired caging or micellar type effect. In other words, if the bond being broken in the excited state is one of two metal-ligand bonds associated with a bidentate chelating agent, the second unbroken metal-ligand bond will inherently confine the diradical and the radical pair to the locality of the bond. This in turn will enhance the probability of radical re-encounter and thus favor the intersystem crossing for the isotope with an odd number of nucleons, but will not influence the even numbered isotopes. Thus, the odd isotope will tend to return to the ground state while the even numbered isotope will tend to further react as a free radical resulting in chemical partitioning of the even and odd isotopes.

As a specific example, aqueous solutions of diaquodiacetatouranyl, $UO_2(CH_3OO)_2(H_2O)$ hydrolze extensively. Sunlight is found to catalyze the hydrolysis; while the hydrolysis can be suppressed by dissolving the complex in dilute acetic acid, where the excess acetate in solution establishes an equilibrium with respect to exchange of the acetate bound in the complex.

According to the present invention, photolysis of $UO_2(CH_3COO)_2(H_2O)$ in water is used to drive the reaction through an intermediate excited state where the odd or even isotope of U will affect the spin relaxation rate and favor the decomposition of the complex molecules containing $^{238}U$. If only water is present, the likely product of the reaction is a precipitate of $UO_2(CH_3COO)(OH)(H_2O)_n$. The reaction should be stopped at a point that depends mainly on economic considerations based on the tradeoff between yield and extent of enrichment. If insufficient enrichment occurs in one step, the product can be repeatedly passed through several stages of the process. Such sequential processing results in the removal of a fraction of the $^{238}U$ in each step. Variations of the process include photolysis of triacetatouranylate, formed by mixing $UO_2(CH_3COO)_2(H_2O)$ with a salt, $M(CH_3COO)$, where $M=Na^+, K^+, NH_4^+$, or other cations. Photolysis in the presence of other complexing ligands from the displacement series results in a process allowing separation of product from $UO_2(CH_3COO)_2(H_2O)$ by ion exchange chromatography, solvent extraction or other common separation techniques. Selection of one of these variants of the basic process depends mainly on economic considerations.

The advantages of the chemical method for separation of uranium isotopes according to the present invention are numerous. A major advantage is that the reaction can be carried out in solution, avoiding the problems associated with preparing and handling volatile uranium compounds. Furthermore, only conventional chemistry or photochemistry is required. Standard industrial separation techniques can be employed for final separation based on differences in chemical and/or physical properties. Reagent costs are minimal. The overall process is viewed as amenable to the chelate and other reactants being recovered and recycled. The preparatory schemes for uranium chelates are straightforward and plentiful in inorganic chemical literature. Energy requirements are minimal. The reaction sequence can be chemically "fine-tuned" by the selection and use of various ligands and scavengers, while capital investment requirements are viewed as being favorably low.

Having thus described the preferred embodiments with a certain degree of particularly, it is manifest that many changes can be made within the details of operation, operating parameters, and implementation of the steps without departing from the spirit and scope of this invention. Therefore, it is to be understood that the invention is not limited to the embodiments set forth herein for purposes of exemplification, but is to be limited only by the scope of the attached claims, including the full range of equivalents to which each step thereof is entitled.

We claim:

1. A process for isotopic enrichment of uranium comprising the steps of:
   (a) preparing a solution of a uranium compound and solvent characterized in that said uranium compound involves a mixture of uranium isotopes wherein said isotopic mixture is to be enriched and said uranium compound is further characterized in that it possesses at least one excited state in solution wherein the respective isotopes in said excited state preferentially react at different rates by virtue of dissimilar nuclear magnetic moment contributions to the chemical kinetics of the excited state reactions and said chemical reactions of said excited state lead to the isolation of a phase that possesses a uranium isotopic distribution characteristic of enrichment, said uranium compound being the uranyl ion in the presence of at least one complexing ligand, said ligand being selected from the group consisting of $CO_3^{2-}$, $O_2^{2-}$, $F^-$, $CH_3COO^-$, $C_2O_4^{2-}$, and $H_2O$;

(b) exciting said uranium compound in solution thus promoting said chemical reaction that preferentially forms said isolated phase containing said enriched uranium isotopic distribution said excitation involving photolysis of the complexed uranyl ion; and (c) separating said enriched phase thus recovering enriched uranium.

2. A process for isotopic enrichment of uranium comprising the steps of:

(a) preparing a solution of a uranium compound and solvent characterized in that said uranium compound involves a mixture of uranium isotopes wherein said isotopic mixture is to be enriched and said uranium compound is further characterized in that it possesses at least one excited state in solution wherein the respective isotopes in said excited state preferentially react at different rates by virtue of dissimilar nuclear magnetic moment contributions to the chemical kinetics of the excited state reactions and said chemical reactions of said excited state lead to the isolation of a phase that possesses a uranium isotopic distribution characteristic of enrichment, said uranium compound being the uranyl ion in the presence of at least one complexing ligand, said ligand being selected from the group consisting of $CO_3^{2-}$, $O_2^{2-}$, $F^-$, and $CH_3COO^-$;

(b) exciting said uranium compound in solution thus promoting said chemical reaction that preferentially forms said isolated phase containing said enriched uranium isotopic distribution said excitation involving photolysis of the complexed uranyl ion; and (c) separating said enriched phase thus recovering enriched uranium.

3. A process of claim 2 wherein the enriched uranium recovered in step (c) is repeatedly subjected to the sequence of steps (a), (b) and (c) thus achieving an even higher degree of uranium enrichment.

4. A process of claim 2 wherein the solution is an aqueous solution.

5. A process of claim 4 wherein said ligand is the acetate anion, and said excitation is the promotion of the hydrated uranyl acetate complex while in solution to an excited electronic state, and said preferential chemical reaction in said excited state is the precipitation of the hydrated basic salt of uranyl acetate.

* * * * *